(12) United States Patent
Lee et al.

(10) Patent No.: US 12,386,510 B2
(45) Date of Patent: Aug. 12, 2025

(54) STORAGE DEVICE MIGRATING USER DATA STORED IN MEMORY DIE IN AN UNUSABLE STATE

(71) Applicant: SK hynix Inc., Icheon (KR)

(72) Inventors: Jae Il Lee, Icheon (KR); Dong Wook Kim, Icheon (KR); Duck Joo Lee, Icheon (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/467,403

(22) Filed: Sep. 14, 2023

(65) Prior Publication Data
US 2024/0377950 A1 Nov. 14, 2024

(30) Foreign Application Priority Data

May 8, 2023 (KR) ........................ 10-2023-0058957

(51) Int. Cl.
*G06F 3/00* (2006.01)
*G06F 3/06* (2006.01)
*G06F 12/00* (2006.01)

(52) U.S. Cl.
CPC ............ *G06F 3/061* (2013.01); *G06F 3/0647* (2013.01); *G06F 3/0673* (2013.01)

(58) Field of Classification Search
CPC ....... G06F 3/061; G06F 3/0647; G06F 3/0673
USPC ......................................................... 711/165
See application file for complete search history.

(56) References Cited

U.S. PATENT DOCUMENTS

| | | | | |
|---|---|---|---|---|
| 5,687,036 A | * | 11/1997 | Kassab | G11B 5/035 |
| 5,696,921 A | * | 12/1997 | Holt | G11B 5/012 |
| | | | | 710/52 |
| 5,774,285 A | * | 6/1998 | Kassab | G11B 5/012 |
| | | | | 360/25 |
| 6,975,468 B1 | * | 12/2005 | Melrose | G11B 5/59627 |
| | | | | 360/60 |
| 9,432,298 B1 | * | 8/2016 | Smith | H04L 49/9057 |
| 9,542,118 B1 | * | 1/2017 | Lercari | G06F 12/0246 |
| 10,430,478 B1 | * | 10/2019 | Blalock | G06F 16/9566 |
| 10,540,274 B2 | * | 1/2020 | Szubbocsev | G06F 3/0679 |
| 11,537,529 B1 | * | 12/2022 | Lercari | G06F 3/064 |
| 11,556,270 B2 | * | 1/2023 | Lee | G06F 3/0652 |
| 11,567,665 B2 | * | 1/2023 | Malshe | G06F 3/0646 |
| 11,687,270 B2 | * | 6/2023 | Kim | H04L 9/32 |
| | | | | 711/154 |
| 11,886,735 B2 | * | 1/2024 | Bi | G06F 3/0655 |
| 11,947,452 B2 | * | 4/2024 | Tang | G06F 12/0253 |
| 12,019,899 B2 | * | 6/2024 | Kelner | G06F 3/0652 |
| 2004/0083333 A1 | * | 4/2004 | Chang | G06F 12/0246 |
| | | | | 711/E12.008 |

(Continued)

FOREIGN PATENT DOCUMENTS

KR 1020190123038 A 10/2019

*Primary Examiner* — Sheng Jen Tsai

(57) ABSTRACT

A storage device may group a plurality of memory dies into M memory die groups, and migrate, when a first memory die in a first memory die group among the M memory die groups is determined to be in an unusable state, user data stored in user data blocks of the first memory die to a first overprovisioning block group. The first overprovisioning block group may include overprovisioning blocks of memory dies other than the first memory die among the memory dies in the first memory die group.

9 Claims, 12 Drawing Sheets

(56) References Cited

U.S. PATENT DOCUMENTS

| | | | |
|---|---|---|---|
| 2009/0055680 A1* | 2/2009 | Honda | G06F 11/1068 714/E11.023 |
| 2009/0059739 A1* | 3/2009 | Cas | G11B 7/00458 369/30.21 |
| 2009/0059750 A1* | 3/2009 | Cas | G11B 7/0946 369/53.2 |
| 2009/0228637 A1* | 9/2009 | Moon | G11C 29/765 711/E12.008 |
| 2010/0174845 A1* | 7/2010 | Gorobets | G06F 12/0246 711/E12.001 |
| 2011/0280113 A1* | 11/2011 | Berckans | G11B 20/10481 |
| 2012/0254519 A1* | 10/2012 | Ellis | G06F 12/0246 711/E12.008 |
| 2013/0159609 A1* | 6/2013 | Haas | G06F 12/0246 711/103 |
| 2013/0282967 A1* | 10/2013 | Ramanujan | G06F 12/0246 711/114 |
| 2015/0287478 A1* | 10/2015 | Chen | G11C 29/44 714/719 |
| 2015/0324264 A1* | 11/2015 | Chinnakkonda Vidyapoornachary | G06F 11/2084 714/6.11 |
| 2016/0188226 A1* | 6/2016 | Haines | G06F 3/0619 711/103 |
| 2017/0123655 A1* | 5/2017 | Sinclair | G06F 3/061 |
| 2017/0123664 A1* | 5/2017 | Parker | G06F 3/0616 |
| 2017/0123666 A1* | 5/2017 | Sinclair | G06F 3/0604 |
| 2017/0123682 A1* | 5/2017 | Sinclair | G06F 3/0611 |
| 2017/0123726 A1* | 5/2017 | Sinclair | G06F 12/02 |
| 2018/0121134 A1* | 5/2018 | Schuster | G11C 16/10 |
| 2019/0013081 A1* | 1/2019 | Blodgett | H04L 9/0861 |
| 2019/0130984 A1* | 5/2019 | Jean | G11C 16/32 |
| 2019/0172537 A1* | 6/2019 | Peddle | G06F 12/0246 |
| 2019/0294335 A1* | 9/2019 | Kim | G06F 3/061 |
| 2020/0082891 A1* | 3/2020 | Lee | G06F 12/0246 |
| 2021/0012851 A1* | 1/2021 | Huang | G11C 29/886 |
| 2021/0133110 A1* | 5/2021 | Tomic | G06F 12/0882 |
| 2021/0173791 A1* | 6/2021 | Kim | G06F 12/0246 |
| 2021/0192867 A1* | 6/2021 | Fang | G07C 5/0816 |
| 2021/0397348 A1* | 12/2021 | Agarwal | G06F 3/0631 |
| 2022/0058136 A1* | 2/2022 | Li | G06F 12/0253 |
| 2022/0138286 A1* | 5/2022 | Zage | H04L 63/0428 726/26 |
| 2022/0161308 A1* | 5/2022 | Fan | B21D 22/20 |
| 2022/0261182 A1* | 8/2022 | Galenchik | G06F 12/0246 |
| 2022/0374305 A1* | 11/2022 | Yeap | G06F 12/0246 |
| 2023/0061800 A1* | 3/2023 | Muchherla | G06F 3/0631 |
| 2023/0229325 A1* | 7/2023 | Malshe | G06F 3/0652 711/154 |
| 2023/0244397 A1* | 8/2023 | Fujimori | G06F 3/064 711/154 |
| 2023/0326541 A1* | 10/2023 | Hudson | G11C 29/50 |
| 2024/0038313 A1* | 2/2024 | Wei | G11C 16/3495 |
| 2024/0126462 A1* | 4/2024 | Kim | G06F 3/0652 |
| 2024/0220138 A1* | 7/2024 | Inbar | G06F 11/004 |

* cited by examiner

USR_DATA

STORAGE DEVICE MIGRATING USER DATA STORED IN MEMORY DIE IN AN UNUSABLE STATE

CROSS-REFERENCES TO RELATED APPLICATION

The present application claims priority under 35 U.S.C. 119 (a) to Korean patent application number 10-2023-0058957 filed in the Korean Intellectual Property Office on May 8, 2023, which is incorporated herein by reference in its entirety.

BACKGROUND

1. Technical Field

Various embodiments generally relate to a storage device for migrating user data stored in a memory die that is in an unusable state.

2. Related Art

A storage device is a device which stores data on the basis of a request of an external device such as a computer, a mobile terminal such as a smartphone or a tablet, or any of various electronic devices.

The storage device may include a controller for controlling a memory (e.g., a volatile memory/a nonvolatile memory). The controller may receive a command from the external device, and may execute or control an operation for reading, writing, or erasing data with respect to the memory included in the storage device, on the basis of the received command.

Meanwhile, a failure may occur in a specific memory die included in the memory. In this case, the storage device may set the memory die to an unusable state in order not to execute a read operation or a write operation on the memory die.

SUMMARY

Embodiments of the present disclosure may provide a storage device capable of accessing user data stored in a memory die that is in an unusable state.

Embodiments of the present disclosure may also provide a storage device capable of reducing performance variance between memory die groups.

In one aspect, embodiments of the disclosure may provide a storage device including i) a memory including a plurality of memory dies, each including a plurality of user data blocks and a plurality of overprovisioning blocks, and ii) a controller configured to group the plurality of memory dies into M (M is a natural number of 2 or more) memory die groups, and migrate, when a first memory die in a first memory die group among the M memory die groups is determined to be in an unusable state, user data stored in user data blocks of the first memory die to a first overprovisioning block group. In this case, the first overprovisioning block group includes overprovisioning blocks of memory dies other than the first memory die among the memory dies in the first memory die group.

In another aspect, embodiments of the disclosure may provide a storage device including i) a memory including a plurality of memory dies each including a plurality of memory blocks, and ii) a controller configured to group the plurality of memory dies into M (M is a natural number of 2 or more) memory die groups, determine a first memory die included in a first memory die group among the M memory die groups to be in an unusable state, migrate user data stored in the first memory die to a first memory block group including one or more memory blocks included in the first memory die group, and determine whether to migrate a part of the user data stored in the first memory block group to a second memory block group including one or more memory blocks included in a second memory die group among the M memory die groups.

In another aspect, embodiments of the disclosure may provide a storage device including i) a memory including a plurality of memory dies each including a plurality of memory blocks, and ii) a controller configured to group the plurality of memory dies into M (M is a natural number of 2 or more) memory die groups, determine a first memory die in a first memory die group among the M memory die groups to be in an unusable state, migrate data, corresponding to a target logical address, among user data stored in the first memory die to a second memory die group among the M memory die groups, and control the data corresponding to the target logical address using a flash translation layer (FTL) instance corresponding to the second memory die group.

According to the embodiments of the present disclosure, it is possible to access the user data stored in the memory die that is in the unusable state, and reduce the performance variance between the memory die groups.

DETAIL DESCRIPTION OF THE EXEMPLARY EMBODIMENTS

Figure 1:
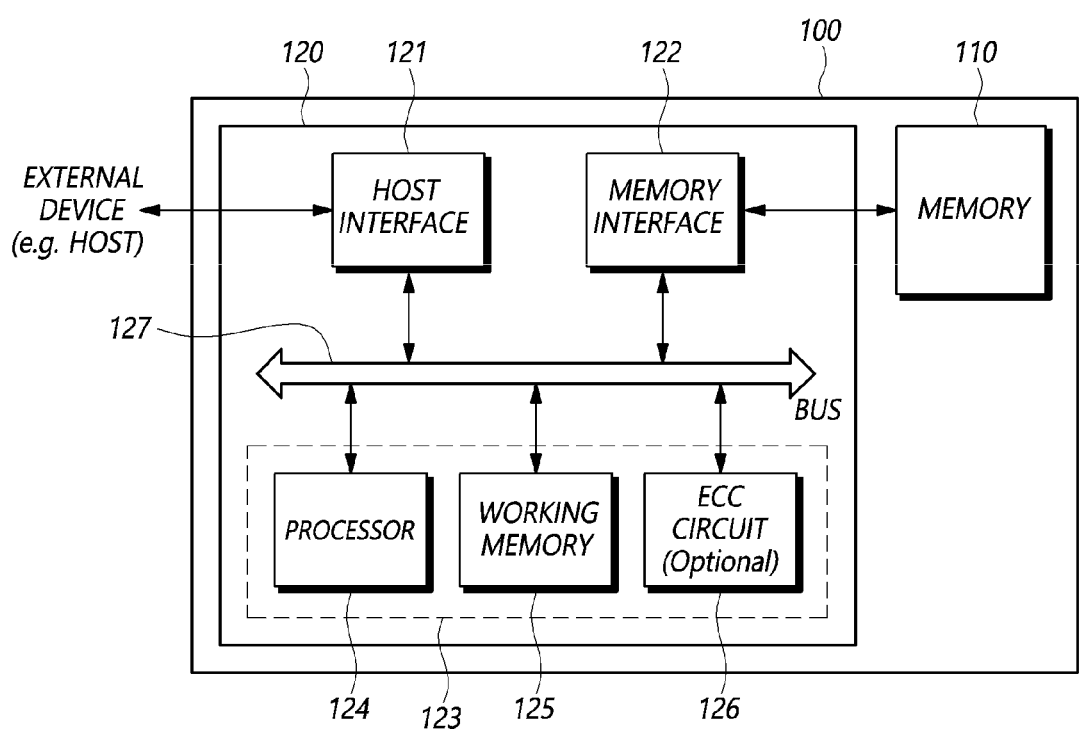
FIG. 1 illustrates a storage device according to an embodiment of the present disclosure.

Hereinafter, embodiments of the present disclosure are described in detail with reference to the accompanying drawings. Throughout the specification, reference to "an embodiment," "another embodiment," or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators, and other signal generating and signal processing features may include, for example, a memory or other storage device for storing code or instructions to be executed, for example, by a computer, processor, microprocessor, controller, or other signal processing device.

FIG. 1 illustrates a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include a read operation, a program operation (also referred to as a write operation), and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be output to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
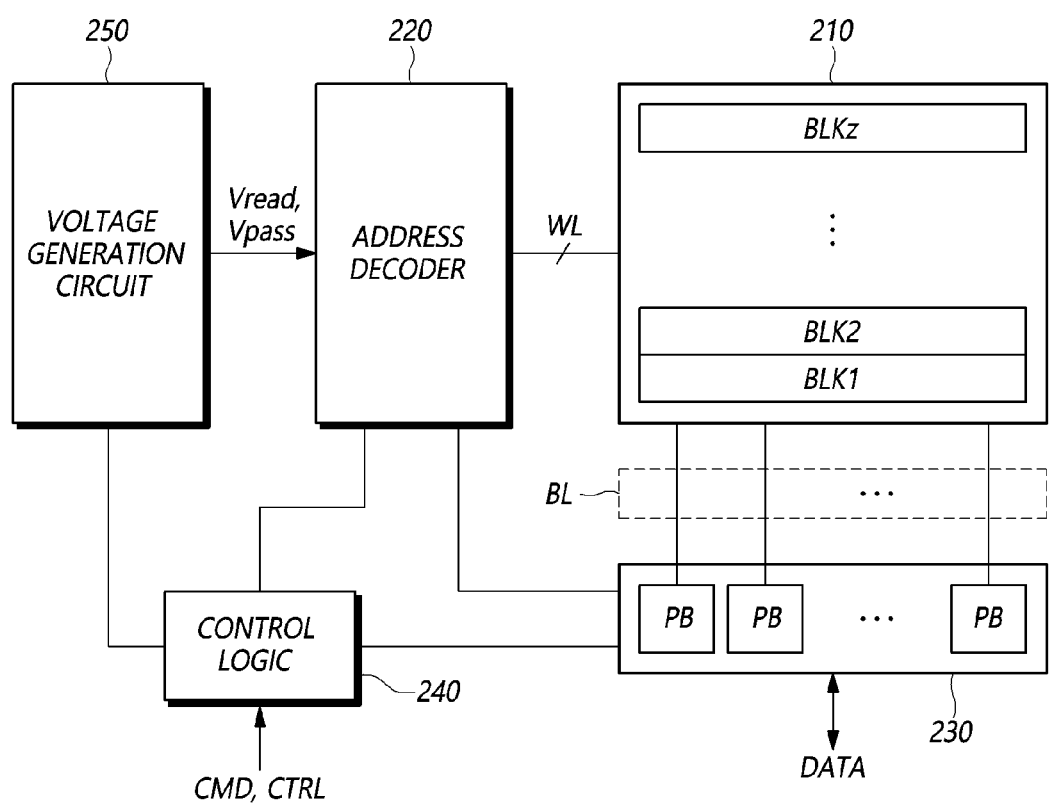
FIG. 2 illustrates a memory of FIG. 1.

FIG. 2 illustrates the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
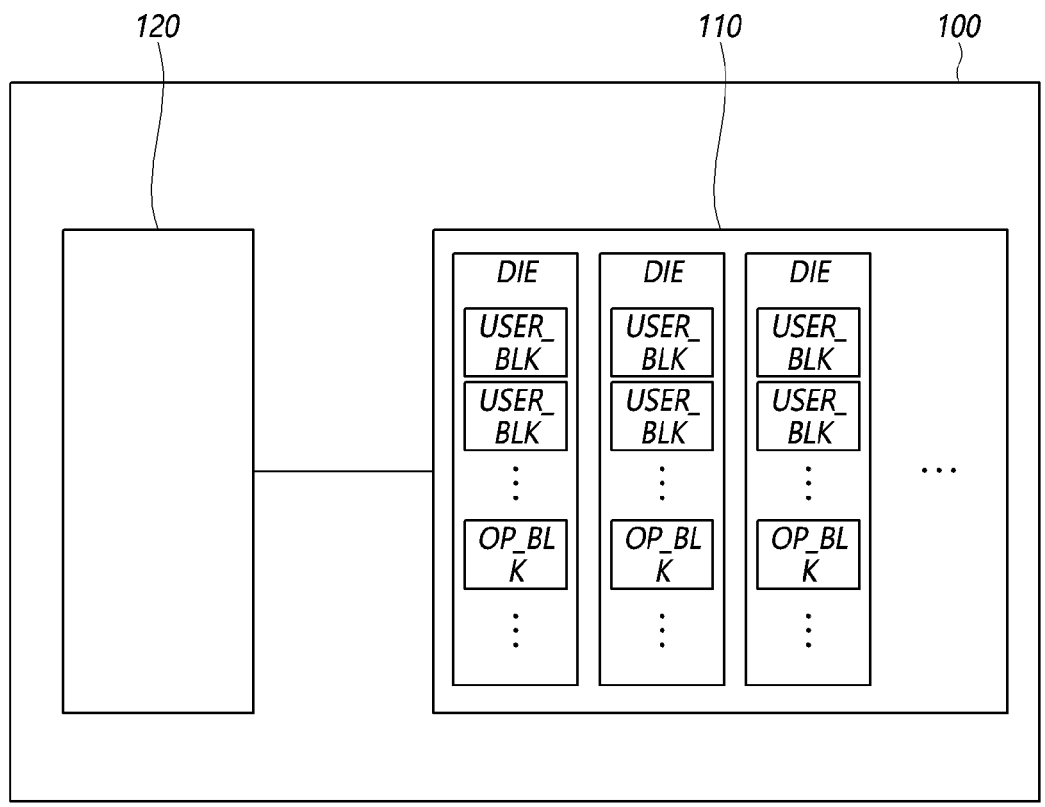
FIG. 3 illustrates a storage device according to an embodiment of the present disclosure.

FIG. 3 illustrates a storage device 100 according to an embodiment of the present disclosure.

Referring to FIG. 3, the storage device 100 may include a memory 110 and a controller 120.

The memory 110 may include a plurality of memory dies DIE. Each of the plurality of memory dies DIE may include a plurality of user data blocks USER_BLK and a plurality of overprovisioning blocks OP_BLK. Each memory die DIE may include a plurality of memory blocks, and each of the plurality of memory blocks may be classified as a user data block USER_BLK or an overprovisioning block OP_BLK.

The user data block USER_BLK is a memory block capable of storing user data requested to be written from outside of the storage device 100, e.g., from a host.

The overprovisioning block OP_BLK is a memory block that may be used to replace a failed user data block or to execute a background operation (e.g., garbage collection, wear leveling, etc.). Some of the memory blocks included in the memory 110 may be allocated as the overprovisioning blocks OP_BLK.

In embodiments of the present disclosure, the controller 120 may group the plurality of memory dies DIE into M (M is a natural number of 2 or more) memory die groups, and control the M memory die groups. Hereinafter, this will be described in detail.

Figure 4:
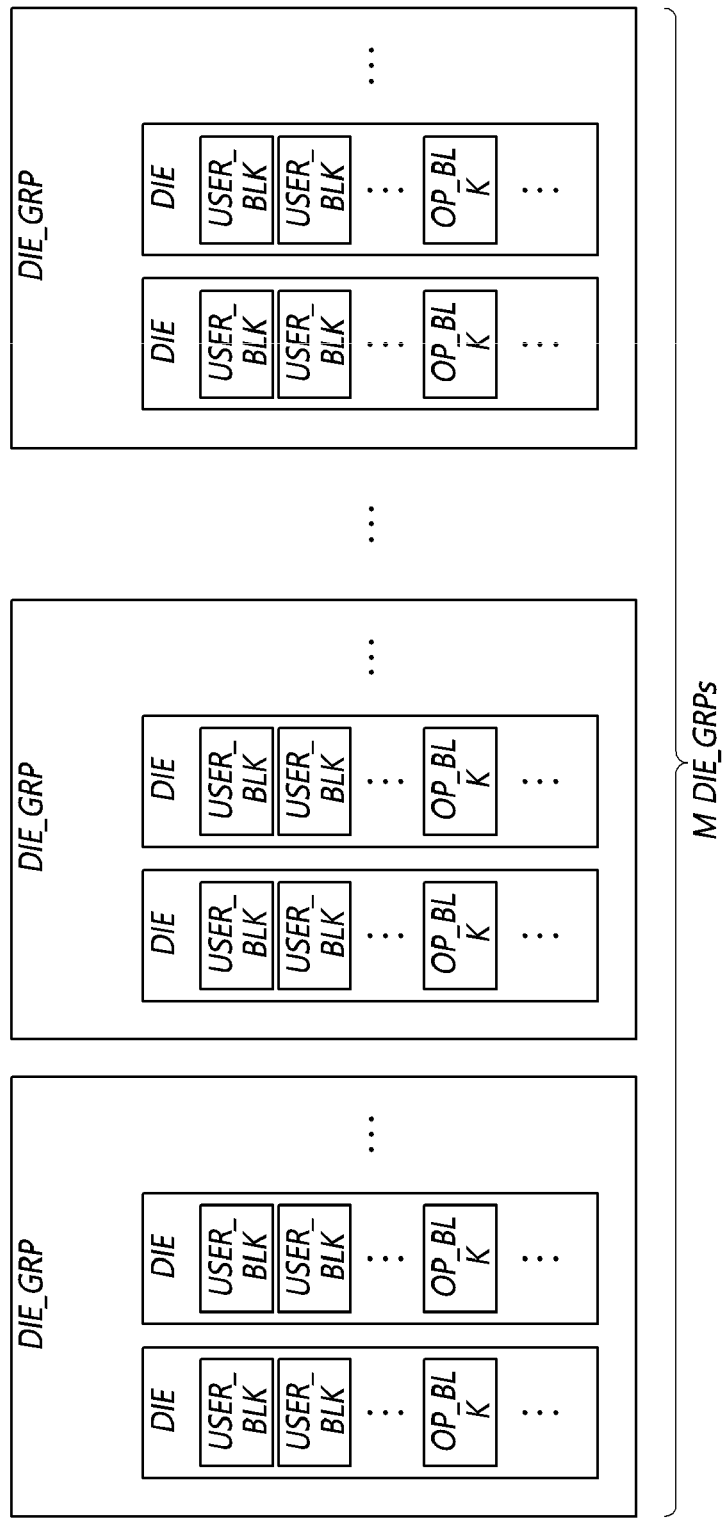
FIG. 4 illustrates a plurality of memory die groups according to an embodiment of the present disclosure.

FIG. 4 illustrates a plurality of memory die groups DIE_GRP according to an embodiment of the present disclosure. The plurality of memory die groups DIE_GRP shown in FIG. 4 will be described with reference to the storage device 100 shown in FIG. 3.

Referring to FIG. 4, the controller 120 of the storage device 100 may group the plurality of memory dies DIE into M memory die groups DIE_GRP.

Each of the M memory die groups DIE_GRP may include one or more memory dies DIE. The controller 120 may generate FTL instances corresponding to the M memory die groups DIE_GRP in order to execute a flash translation layer (FTL) function for the M memory die groups DIE_GRP, respectively. An FTL instance may control an operation on a corresponding memory die group.

For example, an FTL instance may be a process or a thread. The FTL instances respectively corresponding to the M memory die groups DIE_GRP may be executed by different processing cores included in a processor, e.g., the processor 124 shown in FIG. 1, respectively.

Meanwhile, in the embodiments of the present disclosure, the controller 120 of the storage device 100 may determine a specific memory die, among the memory dies included in the M memory die groups DIE_GRP, to be in an unusable state. The unusable state may be referred to as an offline state, a bad state, a retire state, or the like. The specific memory die in the unusable state may be referred to as an unusable memory die.

In this case, in order to access user data stored in the unusable memory die, the controller 120 may migrate the user data stored in the unusable memory die to another memory die. Hereinafter, this will be described in detail with reference to FIG. 5.

Figure 5:
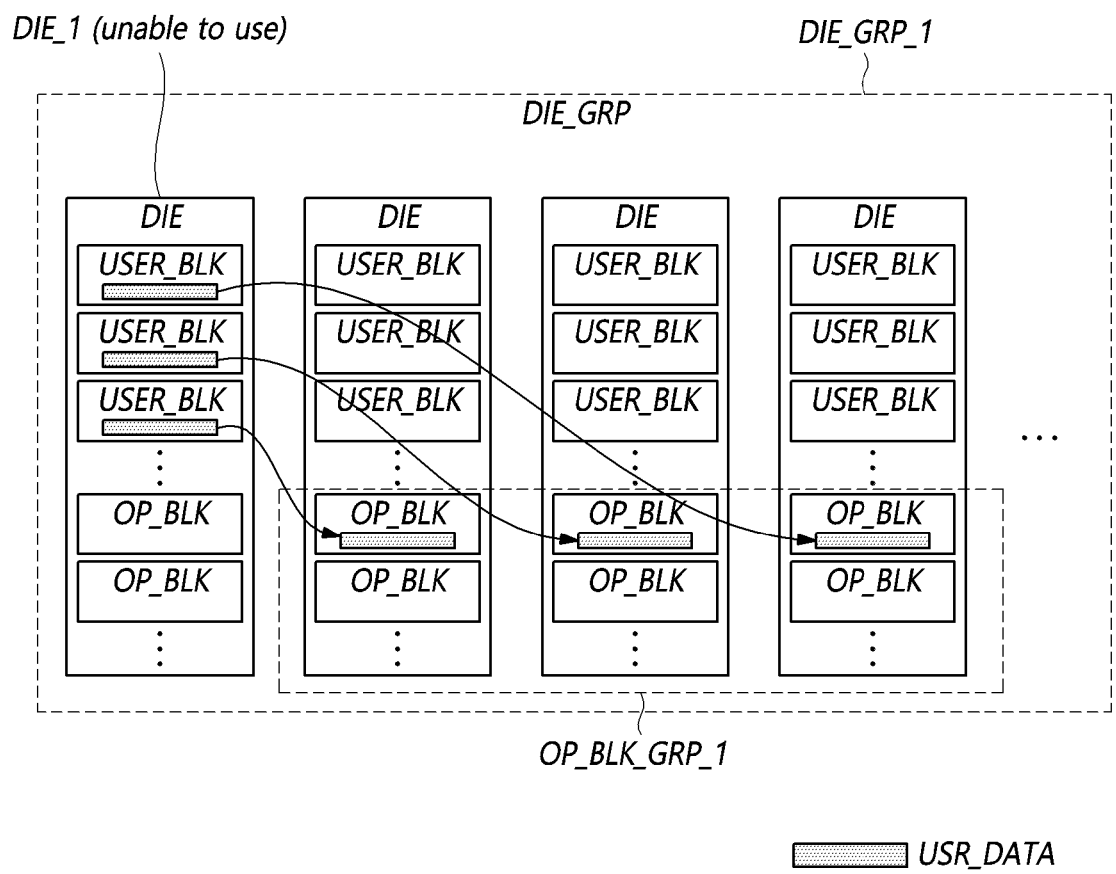
FIG. 5 illustrates an operation in which a storage device migrates user data to a first overprovisioning block group according to an embodiment of the present disclosure.

FIG. 5 illustrates an operation in which a storage device 100 migrates user data USR_DATA to a first overprovisioning block group OP_BLK_GRP_1 according to an embodiment of the present disclosure. The operation illustrated in FIG. 5 will be described with reference to the storage device 100 shown in FIG. 3.

Referring to FIG. 5, the controller 120 of the storage device 100 may determine a first memory die DIE_1 included in a first memory die group DIE_GRP_1 among the M memory die groups DIE_GRP to be in the unusable state. When the first memory die DIE_1 is determined to be in the unusable state, the storage capacity of the first memory die group DIE_GRP_1 may decrease.

The condition under which the controller 120 determines that the first memory die DIE_1 is in the unusable state may vary.

For example, the controller 120 may determine the first memory die DIE_1 to be in the unusable state when the number of bad blocks included in the first memory die DIE_1 is greater than or equal to a threshold bad block number.

As another example, the controller 120 may determine the first memory die DIE_1 to be in the unusable state when a rate at which a failure occurs in read operations executed on the first memory die DIE_1 for a predetermined time period is greater than or equal to a threshold rate.

When the first memory die DIE_1 is determined to be in the unusable state, the controller 120 may migrate the user data USR_DATA stored in the first memory die DIE_1 to the first overprovisioning block group OP_BLK_GRP_1.

The first overprovisioning block group OP_BLK_GRP_1 may include overprovisioning blocks OP_BLK included in memory dies other than the first memory die DIE_1 among memory dies DIE included in the first memory die group DIE_GRP_1. Meanwhile, overprovisioning blocks included in the first memory die DIE_1 may not be included in the first overprovisioning block group OP_BLK_GRP_1.

Through this, the controller 120 can access the user data USR_DATA even if the first memory die DIE_1 is determined to be in the unusable state.

Meanwhile, the controller 120 may execute correcting the user data USR_DATA while migrating the user data USR_DATA to the first overprovisioning block group OP_BLK_GRP_1. This is because a failure may occur in the user data USR_DATA while accessing the user data USR_DATA stored in the first memory die DIE_1 when the first memory die DIE_1 is determined to be unusable.

This will be described in detail with reference to FIG. 6.

Figure 6:
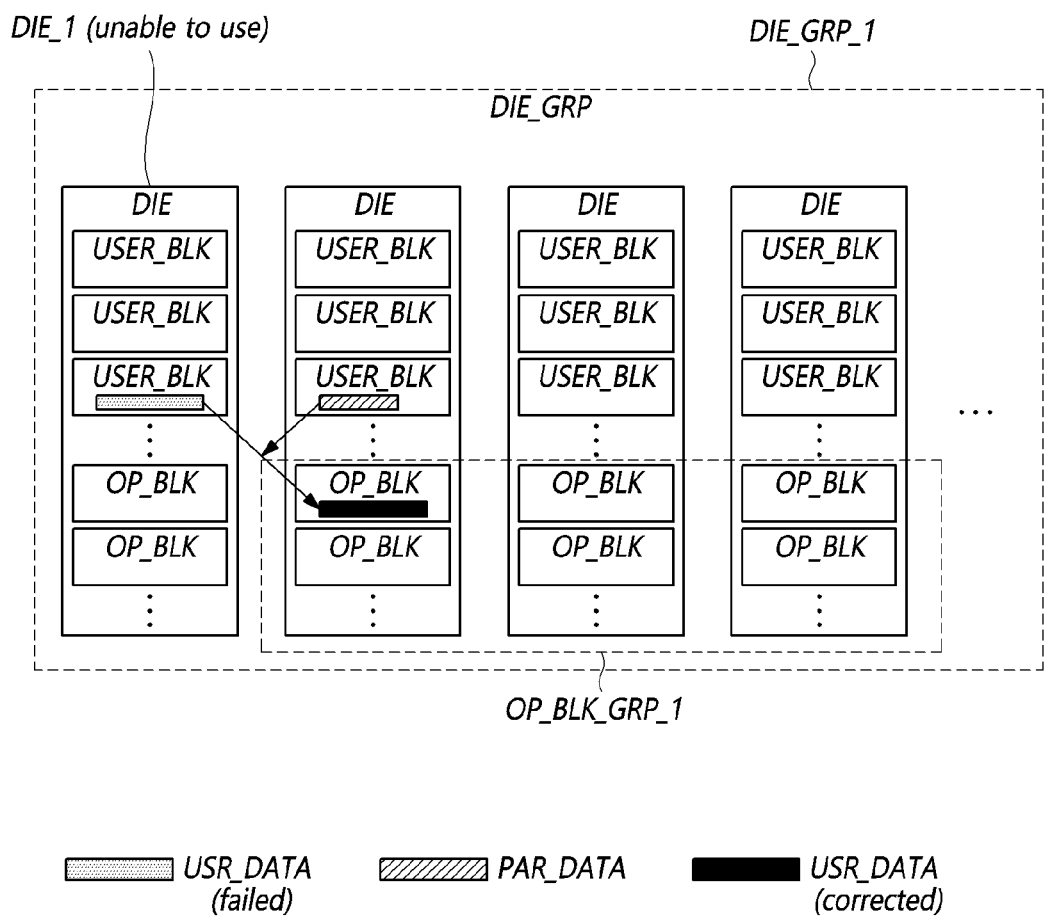
FIG. 6 illustrates an operation in which a storage device executes correcting user data according to an embodiment of the present disclosure.

FIG. 6 illustrates an operation in which a storage device 100 executes correcting user data USR_DATA according to an embodiment of the present disclosure. The operation illustrated in FIG. 6 will be described with reference to the storage device 100 shown in FIG. 3.

Referring to FIG. 6, when the controller 120 of the storage device 100 migrates the user data USR_DATA to the first overprovisioning block group OP_BLK_GRP_1, the controller 120 may execute correcting the user data USR_DATA based on parity PAR_DATA for the user data USR_DATA. After that, the controller 120 may store the corrected user data USR_DATA in the first overprovisioning block group OP_BLK_GRP_1.

Meanwhile, in FIG. 6, the parity PAR_DATA is stored in one of memory dies other than the first memory die DIE_1 in the first memory die group DIE_GRP_1. However, the location where the parity PAR_DATA is stored is not limited by the embodiment of FIG. 6, and the parity PAR_DATA may be stored in the first memory die DIE_1 or in a memory die included in another memory die group rather than the first memory die group DIE_GRP_1.

In the above, when the first memory die DIE_1 is determined to be in the unusable state, the operation of migrating the user data USR_DATA stored in the first memory die DIE_1 to the first overprovisioning block group OP_BLK_GRP_1 has been described.

When the user data USR_DATA stored in the first memory die DIE_1 is migrated to the first overprovisioning block group OP_BLK_GRP_1, the number of free overprovisioning blocks included in the first overprovisioning block group OP_BLK_GRP_1 may decrease.

As a result, a performance deviation may occur between the first memory die group DIE_GRP_1 and other memory die groups among the aforementioned M memory die groups DIE_GRP, and thus performance of the storage device 100 may be degraded.

Accordingly, the storage device 100 may migrate part of the user data USR_DATA stored in the first overprovisioning block group OP_BLK_GRP_1 to another memory die group, thereby resolving the performance deviation between the first memory die group DIE_GRP_1 and the other memory die groups. Hereinafter, this will be described in detail with reference to FIG. 7.

Figure 7:
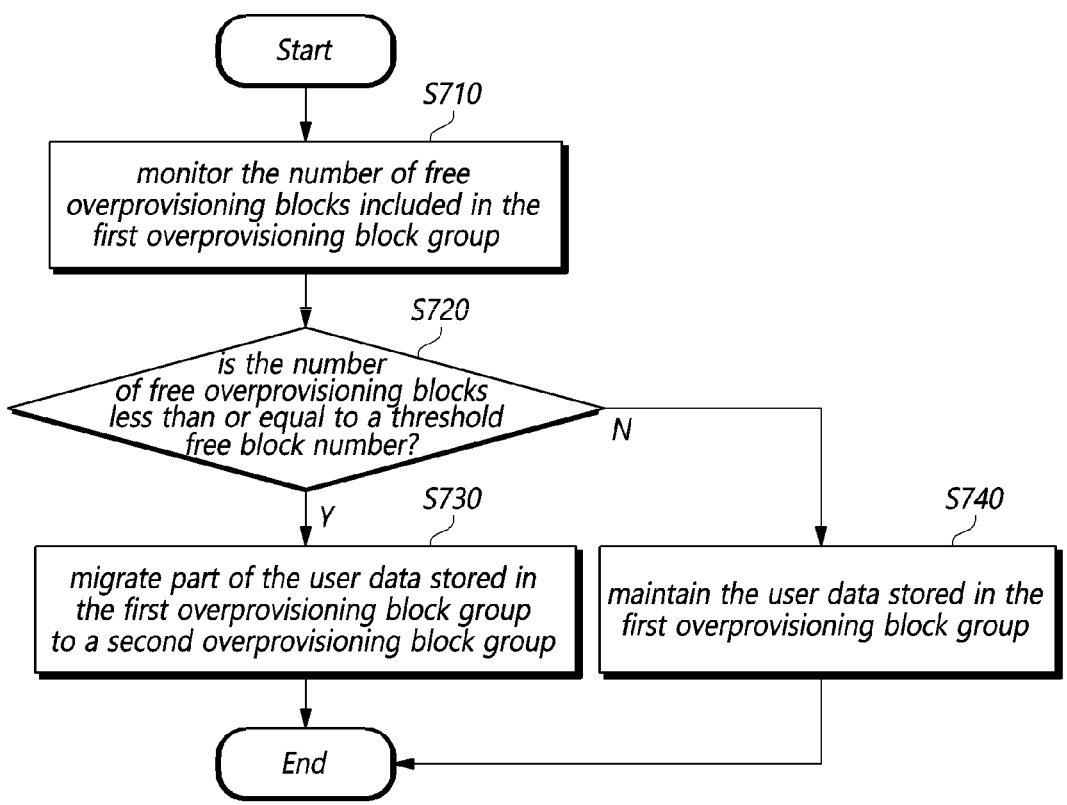
FIG. 7 illustrates an operation in which a storage device determines whether to migrate part of user data stored in a first overprovisioning block group according to an embodiment of the present disclosure.

FIG. 7 illustrates an operation in which a storage device 100 determines whether to migrate part of user data USR_DATA stored in a first overprovisioning block group OP_BLK_GRP_1 according to an embodiment of the present disclosure. The operation illustrated in FIG. 7 will be described with reference to the storage device 100 shown in FIG. 3.

Referring to FIG. 7, the controller 120 of the storage device 100 may monitor the number of free overprovisioning blocks included in the first overprovisioning block group OP_BLK_GRP_1 after migrating the user data USR_DATA to the first overprovisioning block group OP_BLK_GRP_1 (S710). Free overprovisioning blocks are overprovisioning blocks that are in an erased state and thus can store new data.

For example, the controller 120 may execute a process of monitoring a data storage status of each of overprovisioning blocks included in the M memory die groups DIE_GRP, and may monitor the number of free overprovisioning blocks included in the first overprovisioning block group OP_BLK_GRP_1 accordingly.

Meanwhile, the process of monitoring the data storage status of each of the overprovisioning blocks included in the M memory die groups DIE_GRP may be executed when one or more of the plurality of memory dies DIE are set to the unusable state.

Then, the controller 120 may determine whether the number of free overprovisioning blocks included in the first overprovisioning block group OP_BLK_GRP_1 is less than or equal to a threshold free block number (S720). Through this, the controller 120 may determine whether there is a large imbalance between the number of free overprovisioning blocks included in the first memory die group DIE_GRP_1 and the number of free overprovisioning blocks included in the other memory die groups, among the M memory die groups DIE_GRP.

The controller 120 may determine the threshold free block number in various ways.

For example, the controller 120 may determine the threshold free block number as a predetermined value.

As another example, the controller 120 may determine the threshold free block number as a value obtained by multiplying the number of overprovisioning blocks included in a memory die group by a predetermined ratio (e.g., 10%).

As another example, the controller 120 may determine the threshold free block number as a value obtained by subtracting a deviation from an average of the numbers of free overprovisioning blocks respectively included in the M memory die groups DIE_GRP.

The deviation may be determined in various ways. For example, the deviation may be a predetermined value. As another example, the deviation may be a value set based on a standard deviation of the numbers of free overprovisioning blocks respectively included in the M memory die groups DIE_GRP.

When the number of free overprovisioning blocks included in the first overprovisioning block group OP_BLK_GRP_1 is less than or equal to the threshold free block number (S720-Y), the controller 120 may migrate the part of the user data USR_DATA stored in the first overprovisioning block group OP_BLK_GRP_1 to a second overprovisioning block group (S730). In this case, the number of free overprovisioning blocks included in the second overprovisioning block group may be greater than or equal to the threshold free block number.

Through this, the controller 120 may reduce the performance deviation between the M memory die groups DIE_GRP by equalizing the numbers of free overprovisioning blocks respectively included in the M memory die groups DIE_GRP.

In this case, the second overprovisioning block group may include overprovisioning blocks of memory dies included in the second memory die group DIE_GRP_2 among the M memory die groups DIE_GRP. Hereinafter, this will be described in detail with reference to FIG. 8.

On the other hand, when the number of free overprovisioning blocks included in the first overprovisioning block group OP_BLK_GRP_1 is greater than the threshold free block number (S720-N), the controller 120 may maintain the user data USR_DATA stored in the first overprovisioning block group OP_BLK_GRP_1 (S740).

Figure 8:
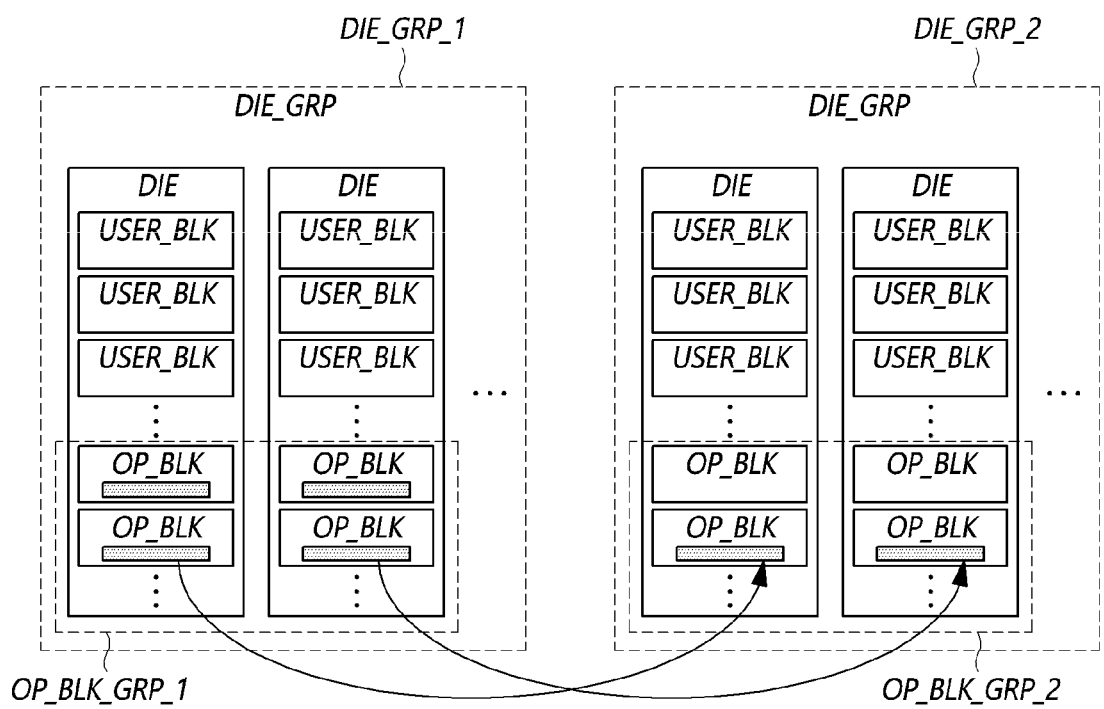
FIG. 8 illustrates an operation in which a storage device migrates part of user data stored in a first overprovisioning block group according to an embodiment of the present disclosure.

FIG. 8 illustrates an operation in which a storage device 100 migrates part of user data USR_DATA stored in a first overprovisioning block group OP_BLK_GRP_1 according to an embodiment of the present disclosure. The operation illustrated in FIG. 8 will be described with reference to the storage device 100 shown in FIG. 3.

Referring to FIG. 8, the controller 120 of the storage device 100 may migrate the part of the user data USR_DATA stored in the first overprovisioning block group OP_BLK_GRP_1 to the second overprovisioning block group OP_BLK_GRP_2. The second overprovisioning block group OP_BLK_GRP_2 may include overprovisioning blocks of memory dies included in the second memory die group DIE_GRP_2 among the M memory die groups DIE_GRP.

Meanwhile, the controller 120 may generate a process of migrating the part of the user data USR_DATA stored in the first overprovisioning block group OP_BLK_GRP_1 to the second overprovisioning block group OP_BLK_GRP_2. For example, this process may operate at a Host Interface Layer (HIL).

Therefore, among the overprovisioning blocks included in the first overprovisioning block group OP_BLK_GRP_1, overprovisioning blocks from which the stored user data has been migrated to the second overprovisioning block group OP_BLK_GRP_2 may be erased and converted into free overprovisioning blocks. Accordingly, the number of free overprovisioning blocks included in the first overprovisioning block group OP_BLK_GRP_1 may increase.

Meanwhile, the controller 120 may determine the part of the user data USR_DATA to be migrated from the first overprovisioning block group OP_BLK_GRP_1 to the second overprovisioning block group OP_BLK_GRP_2 in various ways.

For example, the controller 120 may migrate only part of the user data USR_DATA that is stored in one overprovisioning block among the user data stored in the first overprovisioning block group OP_BLK_GRP_1 to the second overprovisioning block group OP_BLK_GRP_2. After the part of the user data USR_DATA is migrated to the second overprovisioning block group OP_BLK_GRP_2 and the one overprovisioning block from which the part of the user data USR_DATA is migrated is erased, the controller 120 may determine again whether the number of free overprovisioning blocks included in the first overprovisioning block group OP_BLK_GRP_1 is less than or equal to the threshold free block number.

As another example, the controller 120 may migrate part of the user data USR_DATA from the first overprovisioning block group OP_BLK_GRP_1 to the second overprovisioning block group OP_BLK_GRP_2 until the number of free overprovisioning blocks included in the first overprovisioning block group OP_BLK_GRP_1 is equal to or greater than the threshold free block number.

Meanwhile, the storage device 100 may record information about the part of the user data USR_DATA migrated from the first overprovisioning block group OP_BLK_GRP_1 to the second overprovisioning block group OP_BLK_GRP_2 through the use of a separate data structure. Hereinafter, this will be described in detail with reference to FIG. 9.

Figure 9:
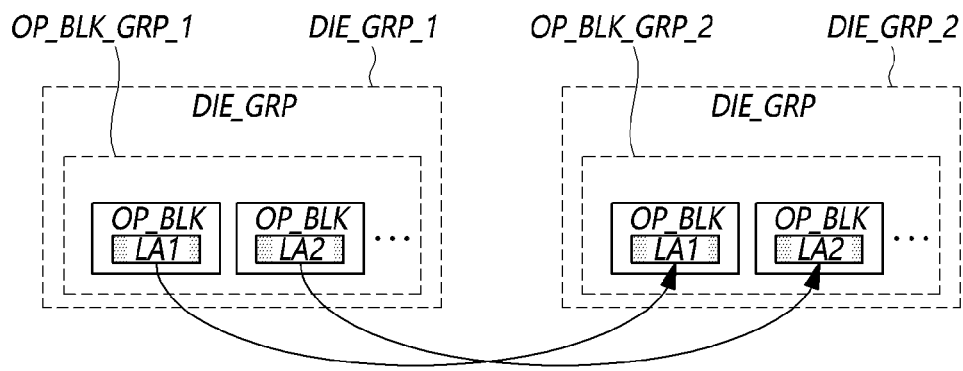
FIG. 9 illustrates an operation in which a storage device manages a remap table according to an embodiment of the present disclosure.
Figure 9:

FIG. 9 illustrates an operation in which a storage device 100 manages a remap table REMAP_TBL according to an embodiment of the present disclosure. The operation illustrated in FIG. 9 will be described with reference to the storage device 100 shown in FIG. 3.

Referring to FIG. 9, first and second parts respectively corresponding to a first logical address LA1 and a second logical address LA2, among the user data USR_DATA stored in the first overprovisioning block group OP_BLK_GRP_1 included in the first memory die group DIE_GRP_1, are migrated to the second overprovisioning block group OP_BLK_GRP_2 included in the second memory die group DIE_GRP_2.

At this time, the controller 120 of the storage device 100 may record information on the first and the second parts of the user data USR_DATA migrated from the first overprovisioning block group OP_BLK_GRP_1 to the second overprovisioning block group OP_BLK_GRP_2 in the remap table REMAP_TBL.

In FIG. 9, the remap table REMAP_TABLE may indicate that the first part of the user data USR_DATA corresponding to the first logical address LA1 is migrated from the first memory die group DIE_GRP_1 to the second memory die group DIE_GRP_2, and may indicate that the second part of the user data USR_DATA corresponding to the second logical address LA2 is migrated from the first memory die group DIE_GRP_1 to the second memory die group DIE_GRP_2.

Figure 10:
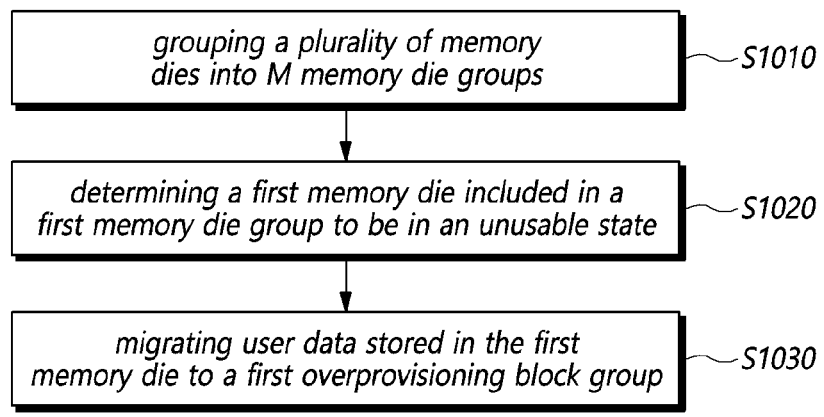
FIG. 10 illustrates an operating method of a storage device according to an embodiment of the present disclosure.

FIG. 10 illustrates an operating method of a storage device 100 according to an embodiment of the present disclosure.

Referring to FIG. 10, the operating method of the storage device 100 may include grouping a plurality of memory dies DIE, each including a plurality of user data blocks USR_BLK and a plurality of overprovisioning blocks OP_BLK, into M (M is a natural number of 2 or more) memory die groups DIE_GRP (S1010).

And the operating method of the storage device 100 may include determining a first memory die DIE_1 included in a first memory die group DIE_GRP_1 among the M memory die groups DIE_GRP to be in an unusable state (S1020).

For example, the operation S1020 may determine the first memory die DIE_1 to be in the unusable state when the number of bad blocks included in the first memory die DIE_1 is greater than or equal to a threshold bad block number.

And the operating method of the storage device 100 may include migrating user data USR_DATA stored in user data blocks of the first memory die DIE_1 to a first overprovisioning block group OP_BLK_GRP_1 (S1030).

The first overprovisioning block group OP_BLK_GRP_1 may include overprovisioning blocks of memory dies other than the first memory die DIE_1 among the memory dies included in the first memory die group DIE_GRP_1.

Meanwhile, the operating method of the storage device 100 may further include i) determining the number of free overprovisioning blocks included in the first overprovisioning block group OP_BLK_GRP_1, and ii) migrating part of the user data USR_DATA stored in the first overprovisioning block group OP_BLK_GRP_1 to a second overprovisioning block group OP_BLK_GRP_2 when the number of free overprovisioning blocks included in the first overprovisioning block group OP_BLK_GRP_1 is less than or equal to a threshold free block number. The second overprovisioning block group OP_BLK_GRP_2 may include overprovisioning blocks of memory dies included in a second memory die group DIE_GRP_2 among the M memory die groups DIE_GRP.

For example, the threshold free block number may be determined as a value obtained by subtracting a deviation from an average of the numbers of free overprovisioning blocks respectively included in the M memory die groups.

Meanwhile, the operating method of the storage device 100 may further include recording information about the part of the user data USR_DATA migrated from the first overprovisioning block group OP_BLK_GRP_1 to the second overprovisioning block group OP_BLK_GRP_2 in a remap table REMAP_TBL.

Figure 11:
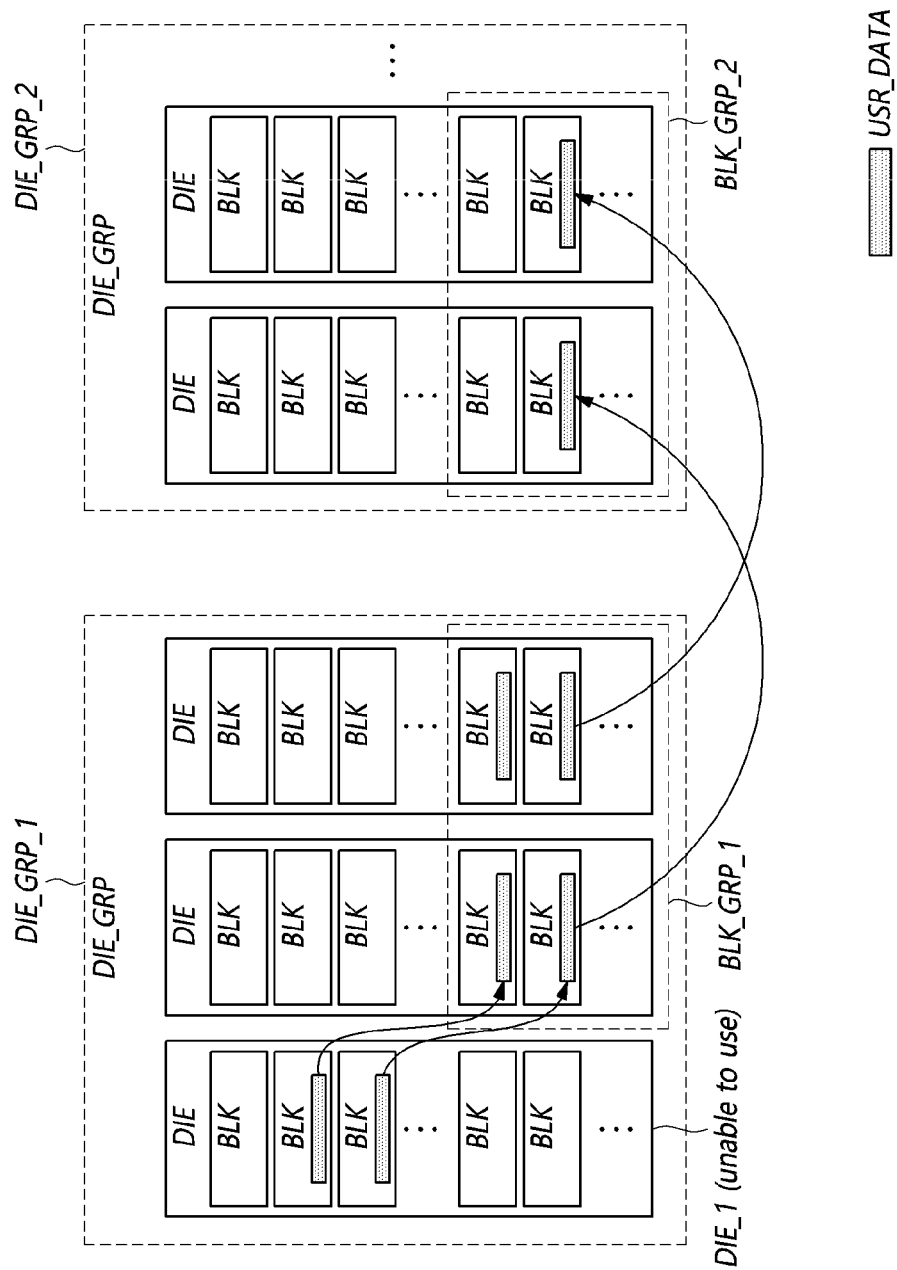
FIG. 11 illustrates an operation in which a storage device migrates part of user data according to an embodiment of the present disclosure.

FIG. 11 illustrates an operation in which a storage device 100 migrates part of user data USR_DATA according to an embodiment of the present disclosure. The operation illustrated in FIG. 11 will be described with reference to the storage device 100 shown in FIG. 3.

As described above, the controller 120 of the storage device 100 may determine that the first memory die DIE_1 included in the first memory die group DIE_GRP_1 is in an unusable state. The controller 120 may migrate user data USR_DATA stored in the first memory die DIE_1 to a first memory block group BLK_GRP_1. The first memory block group BLK_GRP_1 may include one or more memory blocks BLK included in the first memory die group DIE_GRP_1. For example, the first memory block group BLK_GRP_1 may be the aforementioned first overprovisioning block group OP_BLK_GRP_1.

The controller 120 may determine whether to migrate part of the user data USR_DATA stored in the first memory block group BLK_GRP_1 to a second memory block group BLK_GRP_2. The second memory block group BLK_GRP_2 may include one or more memory blocks BLK included in the second memory die group DIE_GRP_2. For example, the second memory block group BLK_GRP_2 may be the aforementioned second overprovisioning block group OP_BLK_GRP_2.

The first memory die group DIE_GRP_1 and the second memory die group DIE_GRP_2 are included in the aforementioned M memory die groups DIE_GRP.

For example, the controller 120 may determine to migrate the part of the user data USR_DATA stored in the first memory block group BLK_GRP_1 to the second memory block group BLK_GRP_2 when the number of free memory blocks included in the first memory block group BLK_GRP_1 is less than or equal to a threshold free block number. The controller 120 may determine the threshold free block number based on an average of the numbers of free memory blocks respectively included in the M memory die groups BLK_GRP.

Figure 12:
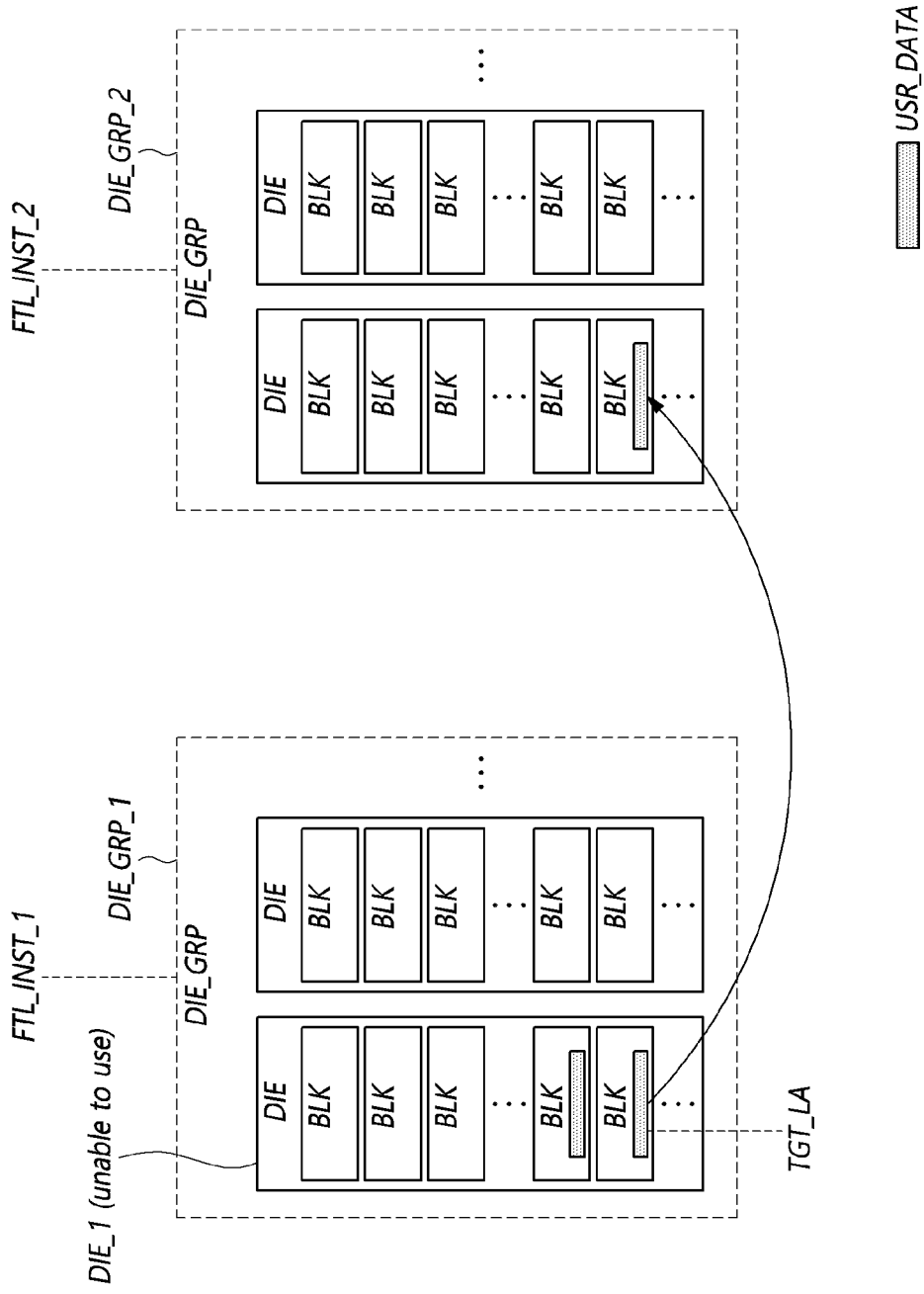
FIG. 12 illustrates an operation in which a storage device migrates part of user data according to another embodiment of the present disclosure.

FIG. 12 illustrates an operation in which a storage device 100 migrates part of user data USR_DATA according to another embodiment of the present disclosure. The operation illustrated in FIG. 12 will be described with reference to the storage device 100 shown in FIG. 3.

As described above, the controller 120 of the storage device 100 may determine that the first memory die DIE_1 included in the first memory die group DIE_GRP_1 to be in an unusable state. In this case, the controller 120 may migrate user data corresponding to a target logical address TGT_LA among the user data USR_DATA stored in the first memory die DIE_1 to the second memory die group DIE_GRP_2.

The first memory die group DIE_GRP_1 and the second memory die group DIE_GRP_2 are included in the aforementioned M memory die groups DIE_GRP.

As described above, the controller 120 may generate FTL instances FTL_INST corresponding to the M memory die groups DIE_GRP, respectively. In FIG. 12, the controller 120 may generate a first FTL instance FTL_INST_1 corresponding to the first memory die group DIE_GRP_1 and a second FTL instance FLT_INST_2 corresponding to the second memory die group DIE_GRP_2.

The controller 120 may migrate the user data corresponding to the target logical address TGT_LA to the second memory die group DIE_GRP_2, and control the user data corresponding to the target logical address TGT_LA using the second FTL instance FTL_INST_2 corresponding to the second memory die group DIE_GRP_2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of memory dies, each including a plurality of user data blocks and a plurality of overprovisioning blocks; and
a controller configured to:
group the plurality of memory dies into M memory die groups, and
migrate, when a first memory die in a first memory die group among the M memory die groups is determined to be in an unusable state, user data stored in user data blocks of the first memory die to a first overprovisioning block group,
wherein the first overprovisioning block group includes overprovisioning blocks of memory dies other than the first memory die among the memory dies in the first memory die group and does not include overprovisioning blocks of the first memory die,
wherein M is a natural number of 2 or more,
wherein the controller is further configured to:
migrate a part of the user data stored in the first overprovisioning block group to a second overprovisioning block group when a number of free overprovisioning blocks in the first overprovisioning block group after migrating the user data to the first overprovisioning block group is less than or equal to a threshold free block number,
wherein the second overprovisioning block group includes overprovisioning blocks of memory dies in a second memory die group among the M memory die groups, AND
wherein the controller is further configured to:
determine the threshold free block number as a value obtained by subtracting a deviation from an average of numbers of free overprovisioning blocks respectively included in the M memory die groups.

2. The storage device according to claim 1,
wherein the controller is further configured to:
determine the first memory die to be in the unusable state when a number of bad blocks in the first memory die is greater than or equal to a threshold bad block number.

3. The storage device according to claim 1,
wherein the controller is further configured to:
determine the first memory die to be in the unusable state when a rate at which a failure occurs in read operations executed on the first memory die for a predetermined time period is greater than or equal to a threshold rate.

4. The storage device according to claim 1,
wherein the controller is further configured to:
correcting the user data based on parity for the user data when migrating the user data to the first overprovisioning block group.

5. The storage device according to claim 1, wherein the deviation is a value set based on a standard deviation of the numbers of free overprovisioning blocks respectively included in the M memory die groups.

6. The storage device according to claim 1,
wherein the controller is further configured to:
record information about the part of the user data migrated from the first overprovisioning block group to the second overprovisioning block group in a remap table.

7. A storage device comprising:
a memory including a plurality of memory dies, each including a plurality of memory blocks; and
a controller configured to:
group the plurality of memory dies into M memory die groups,
determine a first memory die included in a first memory die group among the M memory die groups to be in an unusable state,
migrate user data stored in the first memory die to a first memory block group including one or more memory blocks included in the first memory die group, wherein the one or more memory blocks included in the first memory block group is not included in the first memory die, and
determine whether to migrate a part of the user data stored in the first memory block group to a second memory block group including one or more memory blocks included in a second memory die group among the M memory die groups,
wherein M is a natural number of 2 or more,
wherein the controller is further configured to:
determine to migrate the part of the user data stored in the first memory block group to the second memory block group when a number of free memory blocks in the first memory block group is less than or equal to a threshold free block number, and
wherein the controller is further configured to:
determine the threshold free block number as a value obtained by subtracting a deviation from an average of numbers of free memory blocks respectively included in the M memory die groups.

8. The storage device according to claim 7,
wherein the controller is further configured to:
determine the threshold free block number based on an average of numbers of free memory blocks respectively included in the M memory die groups.

9. A storage device comprising:
a memory including a plurality of memory dies, each including a plurality of memory blocks; and
a controller configured to:
group the plurality of memory dies into M memory die groups,
determine a first memory die in a first memory die group among the M memory die groups to be in an unusable state,
migrate data, corresponding to a target logical address, among user data stored in the first memory die to a first memory block group including one or more memory blocks included in the first memory die group, wherein the one or more memory blocks included in the first memory block group is not included in the first memory die;
migrate a part of the user data stored in the first memory block group to a second memory die group among the M memory die groups, and
control the data corresponding to the target logical address using a flash translation layer (FTL) instance corresponding to the second memory die group,
wherein M is a natural number of 2 or more,
wherein the controller is further configured to:
determine to migrate the part of the user data stored in the first memory block group to a second memory block group included in the second memory die group when a number of free memory blocks in the first memory block group is less than or equal to a threshold free block number, and wherein the controller is further configured to:
determine the threshold free block number as a value obtained by subtracting a deviation from an average of numbers of free memory blocks respectively included in the M memory die groups.

* * * * *